(No Model.)
W. C. HASLAGE.
IMPLEMENT FOR COOLING AND STRAINING MIXED BEVERAGES.
No. 302,483. Patented July 22, 1884.
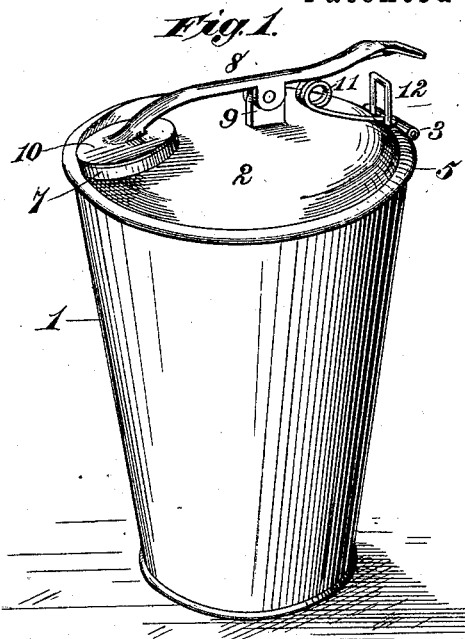
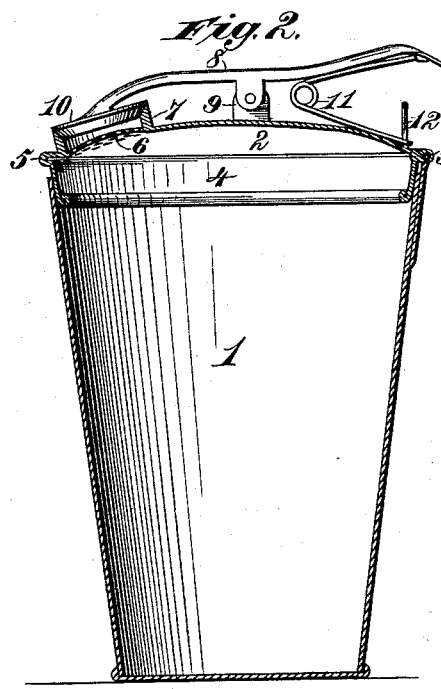
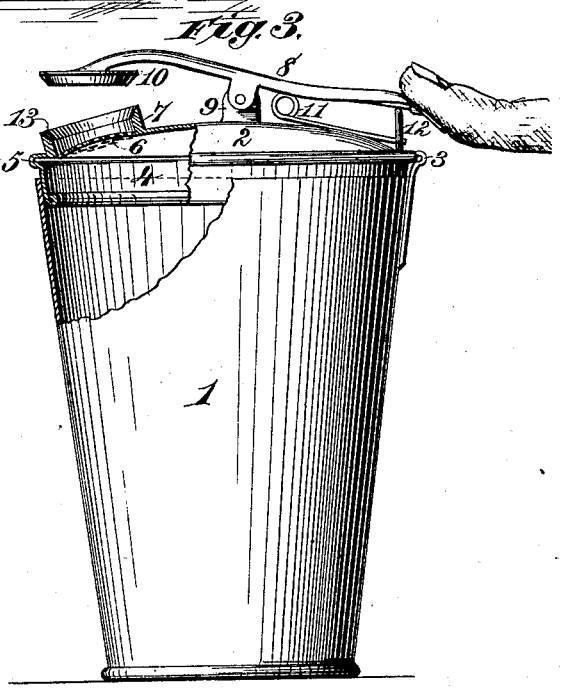
Witnesses.
Robert Everett
A. H. Norrie.
Inventor
William C. Haslage.
By James L. Norris.
Atty.

UNITED STATES PATENT OFFICE.

WILLIAM CRIST HASLAGE, OF PITTSBURG, PENNSYLVANIA.

IMPLEMENT FOR COOLING AND STRAINING MIXED BEVERAGES.

SPECIFICATION forming part of Letters Patent No. 302,483, dated July 22, 1884.

Application filed June 16, 1884. (No model.)

*To all whom it may concern:*

Be it known that I, WILLIAM C. HASLAGE, a citizen of the United States, residing at Pittsburg, Pennsylvania, have invented new and useful Improvements in Implements for Cooling and Straining Mixed Beverages, of which the following is a specification.

This invention relates to improvements in the apparatus for cooling and straining mixed beverages wherein a vessel or goblet is provided with a hinged perforated cover having a perforated plate on its under side which is capable of rotating to close or open the perforations in the cover, whereby the materials mixed with ice can be strained after being shaken to reduce their temperature. In this class of apparatus it has been found difficult, if not impossible, to prevent leakage while shaking the goblet and its contents.

The essential objects of my invention are to avoid the above-mentioned objection, to provide novel means whereby the vessel or goblet can be tightly closed when it is desired to shake the contents, and to provide a novel combination of devices whereby the contents of the vessel or goblet can be rapidly shaken to mix and cool the contents without liability of leakage, and the contents then strained without detachment of any part of the implement or the employment of a separate strainer.

To such ends my invention consists in the combination of a vessel or goblet, a movable but tightly-fitting cover therefor, provided with a strainer and a rising and falling disk, valve, or stopper for covering or exposing the strainer, whereby leakage is prevented when shaking the goblet to mix and cool the contents, and the strainer can be uncovered without moving the lid to pour out and strain the contents.

The invention also consists of other features of construction and combination of devices, which will be hereinafter described and claimed, reference being had to the accompanying drawings, in which—

Figure 1 is a perspective view of an implement constructed in accordance with my invention; Fig. 2, a vertical central sectional view showing the parts in their closed positions, and Fig. 3 a broken sectional view showing the valve or stopper raised to expose or open the strainer for pouring and straining the contents.

In order to enable others skilled in the art to make and use my invention, I will now describe the same in detail, referring to the drawings, in which the number 1 indicates a vessel or goblet, of metal, glass, or other suitable material, having its open mouth provided with a cover or lid, 2, hinged at one edge, as at 3, and provided with an annular pendent flange, 4, and a surrounding marginal bead or rim, 5, for closely and tightly closing the vessel or goblet. The cover or lid at one side is provided with perforations to form a strainer, 6, which is bounded by an annular flange, 7, projecting from the upper surface of the lid, which flange constitutes a pouring-spout, while the perforations strain the contents of the goblet when poured out. A lever, 8, is pivoted upon the upper side of the cover or lid in any suitable manner—as, for example, upon a lug, 9— one end of the lever being provided with a disk, valve, or stopper, 10, corresponding accurately to the inside of the spout-flange 7, for closing the latter and covering the strainer, and the other end of the lever is preferably of a shape to provide a finger or thumb piece, so that while the vessel or goblet is held by one hand the thumb or a finger of that hand which holds the vessel can be conveniently applied to the finger-piece to depress it, thereby tilting the lever and lifting the valve or stopper to uncover the pouring-spout and expose the strainer. The lever and disk constitute a rising and falling valve for controlling the egress of the fluid through the spout and strainer, and, if desired, the disk may be packed to secure a more perfect joint. The lever is acted on by one arm of a spring, 11, the other arm of which bears on the cover or lid in a loop, 12, which latter is provided to constitute a stop to the depression of the lever, and thereby limit the extent of upward movement of the disk, valve, or stopper.

The pendent flange on the cover or lid enables the mouth of the vessel or goblet to be tightly closed, and the swinging valve serves to effectually cover and close the strainer, so that when the ice and other ingredients are introduced into the vessel or goblet the latter can be rapidly shaken to thoroughly mix and reduce the temperature of the contents, with no liability of leakage, after which the thumb or finger of the hand holding the vessel can be used to swing the valve and uncover the strainer to permit the contents to be poured out through the strainer into a glass.

The flange surrounding the strainer might in some instances be dispensed with, and a packing on the valve brought over and in direct contact with the strainer to close the same; but such would be an inferior implement, and I therefore prefer the flange, as it constitutes a suitable spout for convenience in pouring the contents through the strainer into a receptacle—such as a glass. The cover or lid is hinged to the vessel to preserve all parts from possibility of displacement, and at the same time render the implement convenient in use. The edge of the spout is beveled, as at 13, and the valve is preferably beveled at its edge to fit the same, thus producing accurate fitting or union of the parts. The spring restores the valve to its closed position on the spout, and is sufficient to maintain the valve seated while the vessel or goblet is being shaken; but, if desired, the fingers of the hand can be made to bear on the lever or the valve to press the latter more tightly to its seat. The lever, in addition to serving as a medium for controlling the position of the disk, valve, or stopper, also provides a means for conveniently throwing the cover on its hinge into a closed position after the materials to be mixed and cooled have been introduced into the vessel or goblet.

Having thus described my invention, what I claim is—

1. An implement for cooling and straining mixed beverages, consisting of a vessel or goblet, a movable cover or lid therefor, provided with a strainer, and a swinging rising and falling disk or valve for covering or exposing the strainer, substantially as described.

2. The combination, in an implement for cooling and straining mixed beverages, of a vessel or goblet, a movable cover therefor, provided with a strainer, and a pivoted rising and falling disk or valve for exposing or covering the strainer, substantially as described.

3. The combination, in an implement for cooling and straining mixed beverages, of a vessel or goblet, a hinged cover or lid therefor, provided with a strainer, and a rising and falling valve for exposing or covering the strainer, substantially as described.

4. The combination, in an implement for cooling and straining mixed beverages, of a vessel or goblet, a cover or lid therefor, provided with a strainer, and a tilting lever carrying a disk or valve for closing and opening the strainer, substantially as described.

5. The combination, in an implement for cooling and straining mixed beverages, of a vessel or goblet, a hinged cover or lid therefor, provided with a strainer, and a lever pivoted above the lid or cover, and carrying a disk or valve for opening and closing the strainer, substantially as described.

6. The combination, in an implement for cooling and straining mixed beverages, of a vessel or goblet, a cover or lid therefor, having a strainer and a pouring-spout, and a rising and falling valve for opening and closing the strainer, substantially as described.

7. The combination, in an implement for cooling and straining mixed beverages, of a vessel or goblet, a hinged cover or lid therefor, provided with a strainer, a pouring-spout surrounding the latter, and a rising and falling disk, valve, or stopper for closing and opening the strainer and spout, substantially as described.

8. The combination, in an implement for cooling and straining mixed beverages, of a vessel or goblet, a cover or lid therefor, provided with a strainer, a lever carrying a disk or valve for opening and closing the strainer, and a spring for seating the valve, substantially as described.

9. The combination, in an implement for cooling and straining mixed beverages, of a vessel or goblet, a hinged cover or lid having a pendent flange and a strainer, and a pivoted tilting lever on the upper side of the cover or lid, carrying a disk or valve for opening and closing the strainer, substantially as described.

In testimony whereof I have affixed my signature in presence of two witnesses.

WILLIAM CRIST HASLAGE.

Witnesses:
R. W. MILLER,
C. B. McCONNELL.